United States Patent [19]

Lee

[11] Patent Number: 4,732,450

[45] Date of Patent: Mar. 22, 1988

[54] INPUT/OUTPUT COUPLING DEVICE FOR OPTICAL FIBER USED IN HIGH POWER LASER BEAM DELIVERY

[75] Inventor: Chun-Sheu Lee, Torrance, Calif.

[73] Assignee: Amada Engineering & Service Co., Inc., La Mirada, Calif.

[21] Appl. No.: 706,189

[22] Filed: Feb. 27, 1985

[51] Int. Cl.⁴ .............................................. G02B 6/32
[52] U.S. Cl. ................... 350/96.18; 350/96.20
[58] Field of Search ............... 350/96.18, 96.20, 96.10, 350/96.15

[56] References Cited

U.S. PATENT DOCUMENTS

| | | | |
|---|---|---|---|
| 4,021,099 | 5/1977 | Kawasaki et al. | 350/96.18 X |
| 4,135,779 | 1/1979 | Hudson | 350/96.20 X |
| 4,475,788 | 10/1984 | Tomassini et al. | 350/96.18 X |
| 4,538,278 | 8/1985 | Gergely | 350/96.18 X |
| 4,657,014 | 4/1987 | Edelman et al. | 350/96.15 X |

FOREIGN PATENT DOCUMENTS

| | | | |
|---|---|---|---|
| 0113024 | 7/1984 | European Pat. Off. | 350/96.20 X |
| 2517019 | 10/1976 | Fed. Rep. of Germany | 350/96.18 |
| 3225452 | 1/1983 | Fed. Rep. of Germany | 350/96.20 |

Primary Examiner—John Lee
Attorney, Agent, or Firm—Wigman & Cohen

[57] ABSTRACT

The present invention relates to an input/output fiber coupling device for an optical fiber. The device includes a chamber wall having an opening at one side and a bore at the opposite side. The chamber wall forms a cavity therein. A focusing lens fits within the opening, the lens having input and output laser beam paths aligned with the fiber longitudinal axis, and focuses a laser beam onto the end face of the fiber which is inserted into the cavity through the bore. An index-matching fluid circulates within the cavity between the lens and the fiber end face.

5 Claims, 8 Drawing Figures

INPUT/OUTPUT COUPLING DEVICE FOR OPTICAL FIBER USED IN HIGH POWER LASER BEAM DELIVERY

BACKGROUND OF THE INVENTION

1. Field of The Invention

The present invention relates to a laser beam transmission through flexible optical waveguides, more particularly to a method and apparatus for inputting a high power laser beam into optical fiber end faces or vice versa with high efficiency (i.e., low reflection loss) and reducing optical damage to the fiber ends.

2. Description of The Prior Art

In conventional optical fiber beam delivery system, a laser beam is directly focused onto the end face of an optical fiber which is optically polished.

However, due to refractive index mismatch of the media at the interface (i.e., air and waveguide material), Fresnel reflection, which is given for normal incident light beam by $R=(n-1)^2/(n+1)^2$ where n is the relative index of refraction of the interface, brings about coupling loss of the laser power. In addition, micro-irregularity on the fiber end faces resulting from polishing offers an additional channel for coupling loss due to scattering.

Moreover, the laser beam is focused onto the input end of the fiber resulting in development of extremely high power density at the interface region. As a result, optical damage to the fiber end surfaces poses a limit to the input power level for safe transmission. In particular, micro-irregularity (or roughness) on an optical surface can severly reduce the optical damage threshold of the surface. Therefore, it was hard to input the high power laser beam into the fiber end face or vice versa.

There is another problem at both input and output ends of the fiber as a high power laser beam is transmitted through it. Continual burning of cladding of the fiber at both input and output ends due to overheating of the cladding has been reported. This problem may be attributed to mode-mismatch between the transverse modes of the focused laser beam and the guided (core) modes of the fiber. Namely, if the transverse mode (i.e. spatial distribution) of a focussed light beam incident on the fiber end face is not completely matched with the spatial distribution of the guided mode 1 shown in FIG. 1, the focussed light beam may excite in the fiber not only the guided mode 1 but also the whispering-gallery modes 2 shown in FIG. 2, wherein the fiber 3 comprises the core 4 and the cladding 5. Therefore a light beam, after being input into a fiber, propagates through the fiber partially in the guided modes and partially in the whispering-gallery modes, so that the guided modes will be emitted outwards from the other end of the fiber and the whispering gallery modes will be trapped in the cladding layer of the fiber. Consequently a significant portion of the laser power is trapped in the cladding layer, resulting in excessive heat deposition in this layer due to optical absorption.

SUMMARY OF THE INVENTION

It is an object of the present invention to provide a simple method and apparatus for achieving high coupling efficiency by reducing Fresnel reflection loss due to index-mismatch at the interface and suppressing scattering loss due to surface micro-irregularity.

It is another object of the present invention to provide a simple method and apparatus for increasing optical damage threshold of the fiber end by precluding optical damage due to the surface micro-irregularity.

It is a further object of the present invention to provide a simple method and apparatus for preventing burning (or overheating) of the cladding by nullifying the excitation of whispering-gallery modes in the cladding layer and removing the heat generated in the fiber near the end region due to optical absorption of the residual whispering-gallery modes.

These and other objects are accomplished by an apparatus comprising a chamber wall having an opening at one side and a bore at the opposite side of said one side, said chamber wall forming a cavity therein, a focussing lens fitted in said opening, said lens having output laser beam paths aligned with the fiber longitudinal axis and focusing a laser beam onto the end face of the fiber which is inserted into said cavity through said bore, and an index-matching fluid circulating within the cavity between the lens and the fiber end face, wherein the end portion of the fiber is immersed in the index-matching fluid. The refractive indices of said lens, said index-matching fluid and the core of the fiber are substantially of same magnitude.

Further objects and advantages of the present invention will be apparent from the following description and accompanying drawings which, by way of illustration, show preferred embodiments of the present invention and the principles thereof.

DESCRIPTION OF THE PREFERRED EMBODIMENT

Figure 1:
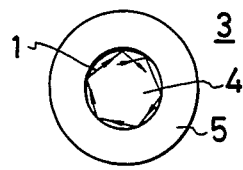
FIG. 1(A) and FIG. 1(B) are end and perspective views showing a guided mode of laser beam transmission in a conventional optical fiber.
Figure 1:
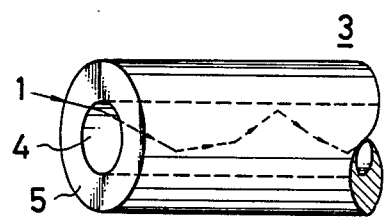
Figure 2:
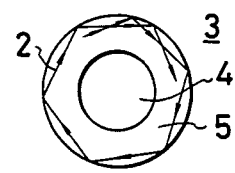
FIG. 2(A) and FIG. 2(B) are end and perspective views showing a whispering-gallery mode of laser beam transmission in a conventional optical fiber.
Figure 2:
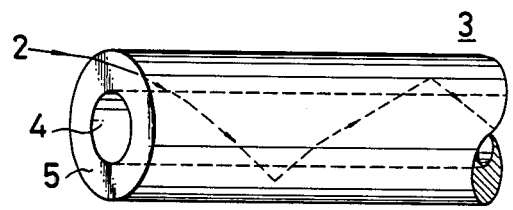
Figure 3:
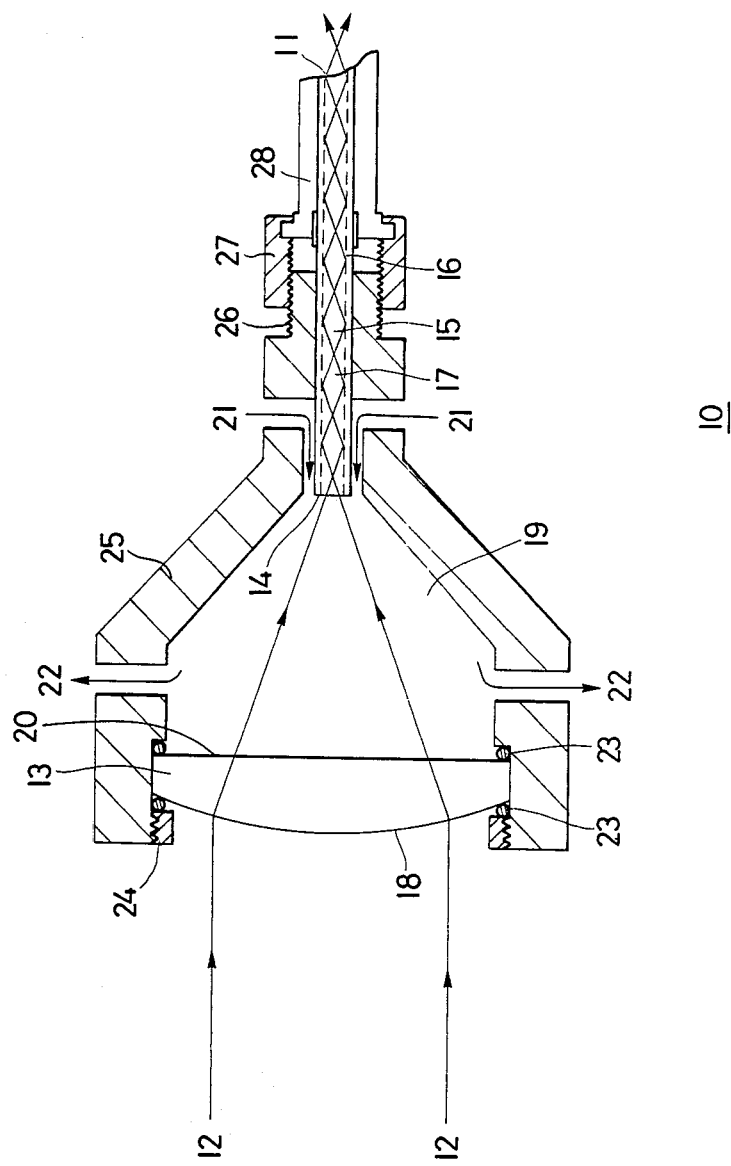
FIG. 3 is side section view of the input/output coupling device for optical fiber embodying the present invention.

Referring to the drawings, FIG. 3 shows a first embodiment of the invention comprising an input (or output) coupler 10 and an optical fiber 11.

A high power laser beam 12 is focused by the lens 13 onto the end face 14 of the fiber 11 which is composed of a core 15 and a cladding 16, where the refractive index of the lens is substantially equal to that of the core of the fiber $n_o$ and the refractive index of the cladding $n_1$ is smaller than that of the core of the fiber $n_o$. The focused laser beam 17 propagates along the fiber 11 within the core 15 due to total-internal reflection at the core 15 and cladding 16 interface. The front face 18 of the lens 13 is coated with antireflection (AR) thin film at the wavelength of the laser beam 12 such that Fresnel reflection loss at the entrance surface 18 is minimized. The cavity region of the coupler 10 is filled with an index-matching fluid 19 which is transparent to the laser beam 12 and whose index of refraction n is substantially equal to those of the lens 13 and the core 15 of the fiber 11 i.e. $n=n_o$; as a result, Fresnel reflection at glass surfaces 14 and 20 is frustrated. The index-matching fluid 19 circulates through the inlets 21 and the outlets 22 such that the heat generated in the fiber near the end region 14 due to optical absorption is removed to prevent burning (or overheating) of the cladding. The O-rings 23 and the compressing ring 24 are used to seal the chamber 25 (made of aluminum or copper) of the coupler 10. The fine-threaded screw 26 and knob 27 assembly incorporated with the device to provide accurate adjustment of the focal plane of the lens 13 relative to the end face 14 of the fiber core 15 for optimal coupling efficiency. The fiber 11 is protected by a jacket and cable assembly 28.

Figure 4:
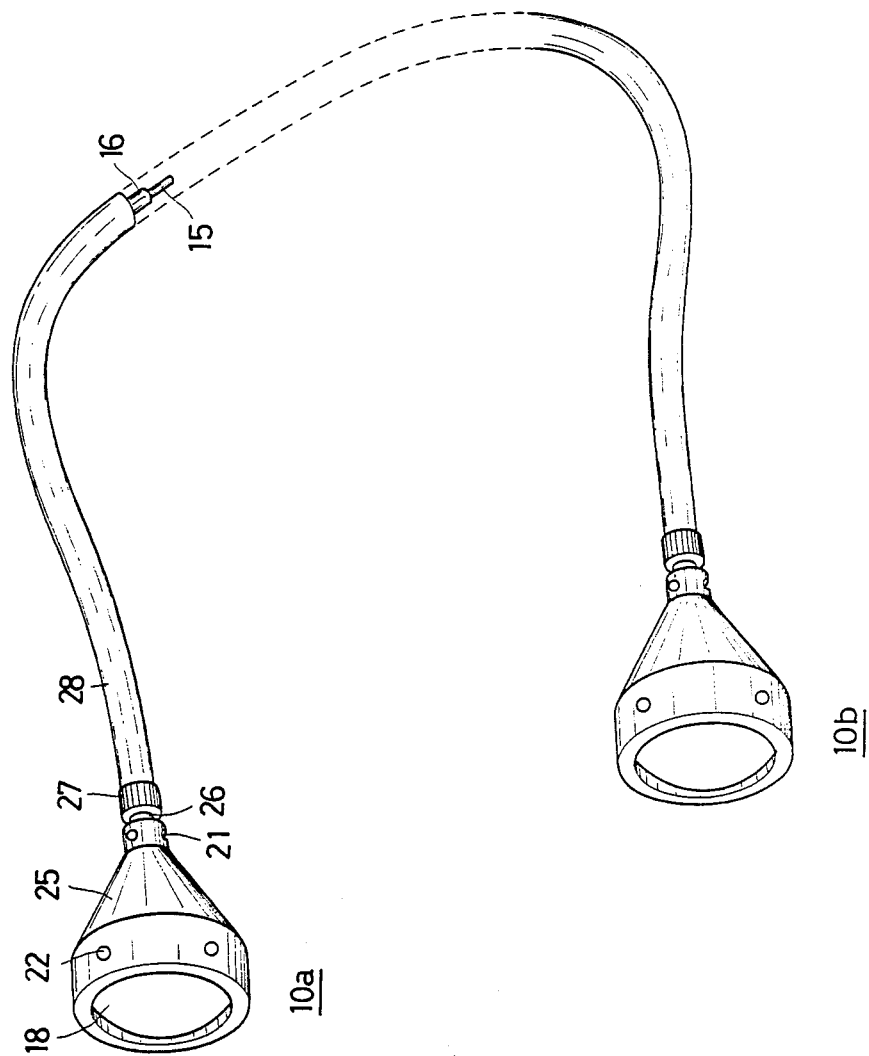
FIG. 4 is a partially broken away isometric view of a laser-fiber coupling device constructed in accordance with this invention.

In FIG. 4, a complete embodiment of the optical fiber beam delivery device 30 is illustrated. The input coupler 10a and output coupler 10b are connected to the cable 28.

The optical fiber coupler described herein provides followings several distinct features for efficient transmission of a high power laser beam through a flexible optical fiber.

(1) As is indicated in the earlier discussion, due to refractive index mismatch between the two media which form an interfacing boundary, a light beam will undergo a reflection upon impinging on the interfacing plane. The reflectivity of the interfacing plane at normal incidence is given by $$R=(n-1)^2/(n+1)^2 \tag{1}$$

where n is the relative index of refraction of the interfacing media. In the present invention the interfaces seen by the light beam 12 (see FIG. 5) are the fiber end face 14, the front and the rear faces, 18 and 20, of the focusing lens 13.

However, the chamber 25 is filled with index-matching fluid 19 whose refractive index is substantially equal to that of the lens 13 and the fiber core 15, such that index-mismatch at the interface 14 and 20 is subdued. As a result, the coupling efficiency of the light beam 12 into the fiber 15 is increased by suppressing reflections at the interfaces.

(2) Index-matching fluid 19 smooths the surface micro-irregularity on the fiber end face 14 resulting in reduction of scattering loss at the fiber end face 14.

(3) Since index-matching fluid 19 smooths the surface micro-irregularity on the fiber end face 14, the optical damage due to the surface micro-irregularity are almost completely precluded to occur and the optical damage threshold of the fiber end faces is increased.

Figure 5:
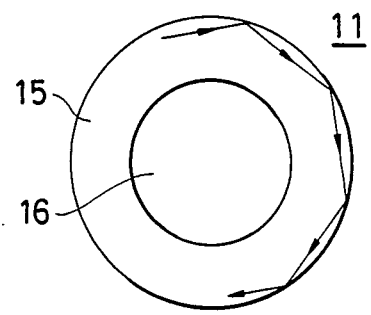
FIG. 5 schematically illustrates a whispering-gallery mode trapped in the cladding layer due to total-internal reflection at the cladding-air interface.
Figure 6:
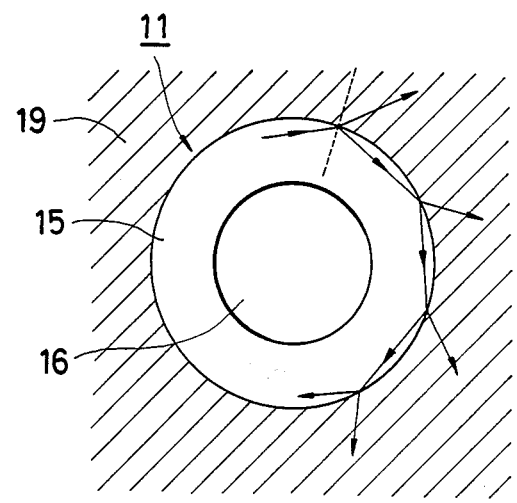
FIG. 6 schematically illustrates a whispering-gallery mode which is substantially transmitted from the cladding layer to the index-matching fluid.

(4) The whispering-gallery in the cladding is basically due to total-internal reflection at the cladding-air interface (shown in FIG. 5). In the present invention, however, the parts of the cladding 16 near the end region of the fiber 11 are surrounded by index-matching fluid 19, of which refractive index $n_o$ is larger than that of the cladding n. Accordingly the total-internal reflection at the cladding-fluid interface are suppressed. In other words, the index-matching fluid 19 provides a channel for the whispering-gallery modes trapped in the cladding to escape outward. As a result, the originally trapped modes as shown in FIG. 5 may become leaky ones as illustrated in FIG. 6, and excessive heat generation in the cladding layer can be eliminated.

It is noteworthy that, although the core mode is reflected only once at the core-cladding interface in FIG. 3, it does not necessarily mean that the whispering-gallery modes excited in the cladding layer 16 also have a chance to escape, since the ways of the propagation of the whispering-gallery modes are quite different from that of the core modes; the end region of the fiber 11 and the index-matching fluid 19 are so arranged that the whispering-gallery modes have several opportunities to escape from the cladding layer 16.

(5) The great part of the whispering-gallery modes trapped in the cladding are eliminated as explained in (4), while a slight part of those modes may be still trapped in the cladding layer. Therefore, the cladding is yet burned by the heat due to the optical absorption of the remaining modes.

The light beam escaped from the cladding 16 of the fiber 11 may re-enter the fiber 11 after reflecting by the inner wall of the chamber 15 around the fiber 11 near the end region 14. Therefore the part of the inner wall of the chamber 15 is preferably covered with a black body which absorbs all light beams.

As an example of one specific embodiment of the invention, a high power Nd:YAG laser can be used with a silica glass fiber for transmission and a liquid glycerol as index-matching fluid. Other combinations of lasers and index-matching fluids will be known to those skilled in the art.

What is claimed is:

1. An input/output fiber coupling device for a longitudinally extending optical fiber defining a longitudinal axis and a coupling end face substantially normal to said longitudinal axis and a side surface running parallel to said longitudinal axis comprising:

a chamber wall defining a generally longitudinally shaped chamber having oppositely disposed first and second sides, said chamber wall forming a cavity therein;

said first side of said chamber wall having an opening adapted to receive a lens, said second side of said chamber wall having a bore adapted to receive the end of the optical fiber with the end face of the optical fiber facing the interior of said cavity;

a fluid input port provided near said bore in said second side of said chamber wall for the introduction of fluid into said cavity along the end of the said side surface of the optical fiber;

a fluid output port in said chamber wall for the withdrawal of fluid from said cavity;

a focussing lens fitted within the opening of the first side of said chamber wall;

said focussing lens having input and output laser beam paths aligned along the longitudinal axis of the optical fiber for focussing a laser beam onto the end face of the fiber; and an index-matching fluid circulating within the cavity between the focussing lens and the optical fiber end face;

wherein said index-matching fluid is introduced into said cavity through said input port, and withdrawn from said cavity through said output port thereby cooling said optical fiber end at least while said laser beam is focussed on the end face of the optical fiber;

said second side of said chamber wall is formed with an outer axial bore having a diameter substantially the same as that of the optical fiber, an inner axial bore having a diameter larger than that of the outer axial bore and adjoining the outer axial bore, and a radial bore communicating said inner axial bore with the outside of the cavity in an axially symmetric manner;

the optical fiber is inserted into the cavity through said outer axial bore and inner axial bore;

said fluid output port is formed on the first side of said chamber wall in an axially symmetric manner; and the fluid is introduced into the cavity through the radial bore and an annulus formed between a wall of the inner axial bore and the surface of the fiber so that fluid flowing between said fluid input port and said fluid output port through said chamber past said lens flows in an axially symmetric manner.

2. The input/output fiber coupling device of claim 1 wherein:

said chamber wall defines a frusto-conically shaped chamber having oppositely disposed larger diameter and smaller diameter sides and a side surface, the side surface being slanted between said larger and smaller diameter sides, said chamber wall forming a cavity therein;

said larger diameter side of said chamber wall having an opening adapted to receive a lens, said smaller diameter side of said chamber wall having a bore adapted to receive the end of the optical fiber with the end face of the optical fiber facing the interior of said cavity;

a fluid input port provided near said bore in said smaller diameter side of said chamber wall for the introduction of fluid into said cavity along the end of the said side surface of the optical fiber; and a focussing lens fitted within the opening of the larger diameter side of said chamber wall.

3. The input/output fiber coupling device of claim 1 wherein said focusing lens has an inner surface facing the optical fiber end face and wherein said device further comprises a fine-threaded screw and knob assembly which is capable of fine adjustment of the distance between the inner surface of the focussing lens and the end face of the fiber;

whereby the optimal coupling efficiency of the optical fiber and the focussing lens is obtained by adjusting the position of the optical fiber relative to the focussing lens.

4. The input/output fiber coupling device of claim 1 wherein said side surface of said end of the optical fiber is provided with a cladding having a predetermined refractive index, said optical fiber being inserted into said bore in said second side of said chamber wall said cavity at least by such a length that a cladding mode excited in the fiber due to a focussed laser beam incident on said end of the fiber is adapted to leak out through the side surface of said end of the optical fiber which is in contact with said index-matching fluid; wherein said index-matching fluid has a refractive index greater than the refractive index of the cladding of said optical fiber.

5. The input/output fiber coupling device of claim 4 wherein:

said optical fiber is inserted into said cavity at least by $d \cdot \tan[\arcsin(n_1/n_0)]$, where d is the diameter of the core of the fiber, and $n_1$ and $n_0$ are refractive indices of the cladding and the core of the fiber, respectively.

* * * * *